United States Patent
Jerez

(10) Patent No.: US 10,531,609 B2
(45) Date of Patent: Jan. 14, 2020

(54) SPRING BIASED RECEPTACLE FOR ROTARY HEAD ASSEMBLY

(71) Applicant: Orlando Jerez, Kenner, LA (US)

(72) Inventor: Orlando Jerez, Kenner, LA (US)

( * ) Notice: Subject to any disclaimer, the term of this patent is extended or adjusted under 35 U.S.C. 154(b) by 0 days.

(21) Appl. No.: 14/420,551

(22) PCT Filed: Aug. 6, 2013

(86) PCT No.: PCT/US2013/053816
§ 371 (c)(1),
(2) Date: Feb. 9, 2015

(87) PCT Pub. No.: WO2014/025799
PCT Pub. Date: Feb. 13, 2014

(65) Prior Publication Data
US 2015/0216122 A1  Aug. 6, 2015

Related U.S. Application Data

(60) Provisional application No. 61/681,314, filed on Aug. 9, 2012.

(51) Int. Cl.
*A01D 34/416* (2006.01)

(52) U.S. Cl.
CPC ..... *A01D 34/4165* (2013.01); *A01D 34/4166* (2013.01)

(58) Field of Classification Search
CPC ............ A01D 34/4165; A01D 34/4166; A01D 34/733; A01D 34/736; A01D 34/416
USPC .................................................. 30/276, 347
See application file for complete search history.

(56) References Cited

U.S. PATENT DOCUMENTS

| 4,852,258 | A | * | 8/1989 | Foster | A01D 34/4162 30/276 |
| 5,622,035 | A | * | 4/1997 | Kondo | A01D 34/733 30/276 |
| 6,052,907 | A | | 4/2000 | Wang | |
| 6,112,416 | A | | 9/2000 | Bridges et al. | |
| 6,912,789 | B2 | | 7/2005 | Price, III | |
| 7,257,898 | B2 | * | 8/2007 | Iacona | A01D 34/416 30/276 |
| 7,412,768 | B2 | * | 8/2008 | Alliss | A01D 34/4163 30/276 |
| 7,743,511 | B2 | | 6/2010 | Jerez | |
| 7,878,097 | B2 | * | 2/2011 | Strader | A01D 34/733 30/276 |
| 8,640,588 | B2 | * | 2/2014 | Strader | A01D 34/733 30/276 |
| 9,210,838 | B2 | * | 12/2015 | Jerez | A01D 34/416 30/347 |
| 2006/0179663 | A1 | * | 8/2006 | Harris | A01D 34/416 30/276 |
| 2008/0141543 | A1 | | 6/2008 | Guerra | |

(Continued)

FOREIGN PATENT DOCUMENTS

JP  2009-171929  *  8/2009 ............. A01D 34/73

*Primary Examiner* — Laura M Lee
(74) *Attorney, Agent, or Firm* — Norton IP Law Firm LLC; Taylor M. Norton

(57) ABSTRACT

An apparatus including a rotary head assembly, which is configured to allow replacement of at least one cutting member. The rotary head assembly includes at least one spring biased cutting member receptacle sized and configured to receive at least one cutting member.

12 Claims, 4 Drawing Sheets

(56) References Cited

U.S. PATENT DOCUMENTS

2009/0038163 A1* 2/2009 Jerez .................... A01D 34/416
30/276
2012/0260508 A1* 10/2012 Duvall ................. A01D 34/733
30/347

* cited by examiner

SPRING BIASED RECEPTACLE FOR ROTARY HEAD ASSEMBLY

REFERENCE TO RELATED APPLICATIONS

This Application is the National Stage of PCT International Patent Application PCT/US2013/053816, filed on Aug. 6, 2013, 2013, which claims the benefit of the priority of commonly-owned U.S. Provisional Patent Appl. No. 61/681,314, filed on Aug. 9, 2012. The disclosures of each of the foregoing are incorporated herein by reference.

TECHNICAL FIELD

This invention relates to rotary head assembly apparatuses, and more specifically, to rotary head assembly apparatus configured to easily replace cutting members necessary to cut unwanted plants.

BACKGROUND

Presently, there are trimming apparatuses known in the art having a rotatable, attachable head for attachment to a powered device, with the head carrying a series of trimmer lines extending axially out about the periphery of the head. Examples of such weed trimming apparatuses include spool and "bump 'n' feed" weed trimming apparatuses with continuous-feed trimming line, automatic-feed trimmer head, and trimming apparatuses using fixed-length pieces of trimming line or blades. However, such weed trimming apparatuses have certain drawbacks which have gone largely unaddressed in this technical field.

Both the "bump 'n' feed" and automatic trimmer head relies on an internal spool with trimmer line reserves. Stress on these apparatuses' trimming lines will cause it break from time to time during use. Because of their designs, the trimmer lines often get twisted, tangled or buried within the spool making it difficult to dispense the proper line length for cutting. As a result, the trimmer head must then be disassembled, the trimmer string unwound and again rewound in the proper manner before the trimmer head will again work as designed. This process is difficult, labor intensive and highly time consuming.

To address the aforementioned problems of the conventional "bump 'n' feed" and automatic trimmer heads, blades or fixed-length trimmer line pieces have been incorporated into the trimmer head. As the blades become dull or the trimmer lines break, often times, it require additional tools and/or a lot of time to replace the worn or broken pieces. Thus, a need exists for a rotary apparatus that does not tangle, twist, or bind cutting members such as the trimmer lines. Furthermore, a need exists for a rotary apparatus that does not have to be disassembled to have new strings or other types of cutting members added. Lastly, a need exists for a rotary apparatus which requires little time and effort to replace the cutting members such as trimmer lines or cutting blades. These needs are met by the present invention as described and claimed below.

SUMMARY OF THE INVENTION

From the foregoing, it is apparent there is still a great and long-felt need for a rotary apparatus, in particular a rotary head assembly, that provides quick and easy insertion of a cutting member in order to resume operation as well as simple and efficient removal of the cutting member when replacing it. The present invention addresses the foregoing need, amongst other needs, in a highly unique and facile way. Thus, in one aspect, the present invention provides a novel rotary apparatus, particularly a rotary head assembly from which a cutting member may extend. Particularly, in at least one of its aspects, this invention provides quick and easy insertion of a cutting member in order to resume operation of the rotary apparatus. In another aspect, the invention also facilitates removal of a cutting member during change out, so that there is no need to disassemble the rotary head assembly of the rotary apparatus, as required in other known trimmer apparatuses. The cutting member of the present invention can be flexible (e.g. wires, strands, etc.), semi-rigid (e.g. plastic blades), or rigid (e.g. metal blades) and may be made of any material and in any shape capable of cutting unwanted plants such as weeds. Non-limiting examples of cutting member materials include plastics (e.g. nylon), metals, metal alloys, and combinations thereof.

This invention provides a rotary apparatus comprising a rotary head assembly configured for attachment to a rotary power source, wherein the rotary head assembly comprises at least one spring biased cutting member receptacle, at least one spring, a top cover end portion and a lower cover end portion, wherein:
  (i) the top cover end portion and lower cover end portion define at least one recess for housing the spring biased cutting member receptacle and the spring; and
  (ii) the spring biased cutting member receptacle optionally either rotates or is fixed onto the rotary head assembly and comprises at least one cutter inlet, at least one cutter outlet, at least one cutting member retainer, and at least one flange, and a non-flange end portion, wherein
    (a) the cutter inlet is positioned opposite the cutter outlet and defines a channel extending from the cutter inlet to the cutter outlet sized and configured to receive at least one cutting member;
    (b) said cutting member retainer is positioned in between the cutter inlet and the cutter outlet and configured so that the cutting member may be inserted into the cutter inlet and engaged with the cutting member retainer;
    (c) the flange and the spring are configured to retain the cutting member to the cutting member retainer when the rotary head assembly is in use and configured to release the cutting member when a desired force is applied to the flange; and
    (d) the non-flange end portion is positioned opposite of the flange.

In another aspect of the invention, provided is an apparatus comprising a rotary head assembly, wherein the rotary head assembly comprises at least one spring biased cutting member receptacle wherein said spring biased cutting member receptacle:
  (i) optionally either rotates or is fixed onto the rotary head assembly;
  (ii) comprises an outer body having at least one recess for receiving at least one spring biased member, wherein said outer body defines at least one cutter inlet and at least one cutter outlet, wherein the cutter inlet is positioned opposite the cutter outlet and defines a channel extending from the cutter inlet to the cutter outlet sized and configured to receive at least one cutting member; the outer body comprises at least one cutting member retainer positioned in between the cutter inlet and the cutter outlet so that the cutting member may be inserted into the cutter inlet and engaged with the cutting member retainer;

(iii) said spring biased member comprises a flange and a non-flange end portion, wherein the non-flange end portion is positioned opposite of the flange; and (iv) said spring biased cutting member receptacle further comprises at least one spring configured to move the non-flange end portion further away from the cutting member retainer, allowing the cutting member to be inserted or removed through the channel when a desired force is applied to the flange and to move the non-flange end portion closer to the cutting member retainer to retain the cutting member within the cutting member retainer when no force is applied to the flange or when the rotary head assembly is in use.

These and other features of this invention will be still further apparent from the ensuing description, drawings, and appended claims.

BRIEF DESCRIPTION OF THE DRAWINGS

In each of the above figures, like numerals are used to refer to like or functionally like parts among the several figures.

FURTHER DETAILED DESCRIPTION OF THE INVENTION

Illustrative implementations of the invention are described below as they might be employed in the construction and use of a rotary apparatus and related method according to at least one implementation of the present invention. It will be of course appreciated that in the development of such an actual implementation, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. In the detailed description below, general discussion of alternative steps, configurations, features and/or components may employ reference to numbered components identified in the accompanying figures. However, it should be appreciated that, unless otherwise explicitly noted, such alternative steps, configurations, features and/or components are not necessarily limited to the particular aspect illustrated in the relevant figures, as the use of such number references in this context is merely for the sake of clarity.

Turning now to the Figures, several illustrative aspects of the apparatus of the present invention are shown. Looking now at FIG. 1, an apparatus comprising a rotary head assembly 10 configured for attachment to a rotary power source (not shown) is shown. The rotary power source may be any source capable to provide sufficient rotation to cut unwanted plants such as weeds. Non-limiting examples of the rotary power source includes any gas-powered, electric-powered, or battery-powered motor found on any standard commercial weed trimming device, such as a "weedeater." The rotary head assembly 10 is sized and configured for attachment to such commercially known weed trimming devices through the use of an attachment member such as a clamp, bolt, or threaded screw (not shown) through the central member aperture 12 defined by the central member 14 of the rotary head assembly.

Figure 1:
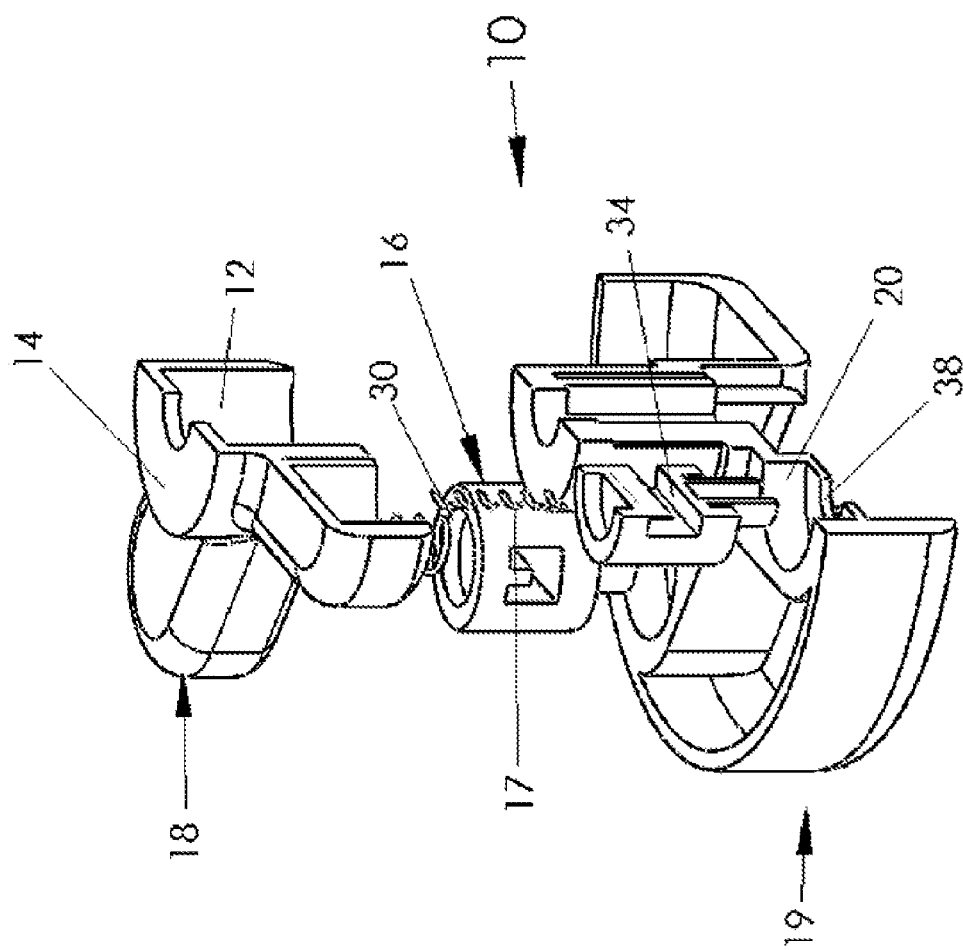
FIG. 1 illustrates the rotary head assembly with one aspect of the present invention.
Figure 2:
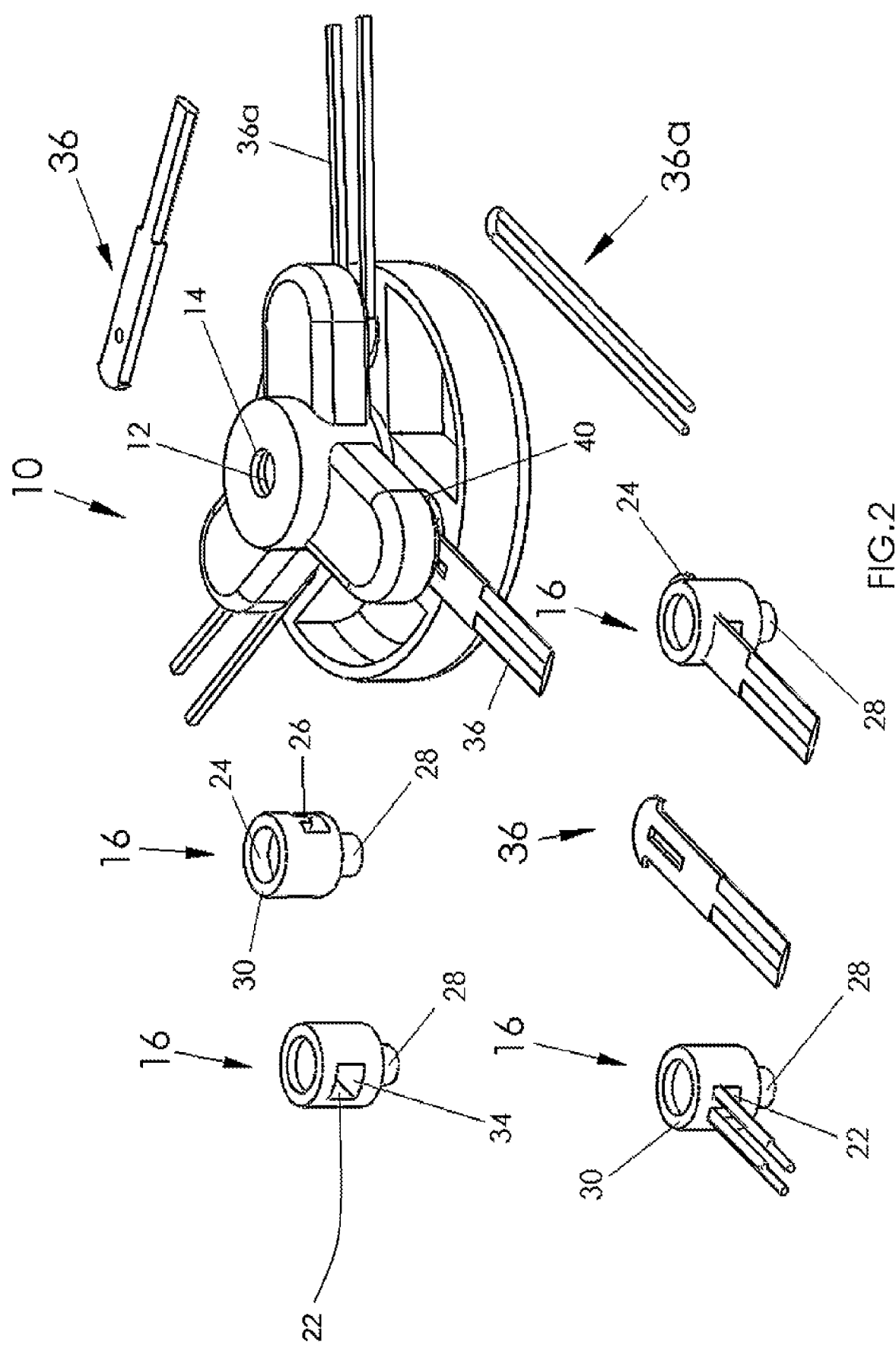
FIG. 2 illustrates the rotary head assembly, the spring biased cutting member receptacle, and the cutting members consistent with one aspect of the present invention.

In one embodiment, as shown in FIGS. 1 and 2, a rotary apparatus is provided comprising a rotary head assembly 10 wherein the rotary head assembly comprises at least one spring biased cutting member receptacle 16, at least one spring 17, a top cover end portion 18 and a lower cover end portion 19, wherein: (i) the top cover end portion and lower cover end portion define at least one recess 20 for housing the spring biased cutting member receptacle and the spring; and (ii) the spring biased cutting member receptacle optionally either rotates or is fixed onto the rotary head assembly and comprises at least one cutter inlet 22, at least one cutter outlet 24, at least one cutting member retainer 26, and at least one flange 28, and a non-flange end portion 30, wherein (a) the cutter inlet is positioned opposite the cutter outlet and defines a channel 34 extending from the cutter inlet to the cutter outlet sized and configured to receive at least one cutting member 36 (36a); (b) said cutting member retainer is positioned in between the cutter inlet and the cutter outlet and configured so that the cutting member may be inserted into the cutter inlet and engaged with the cutting member retainer; (c) the flange and the spring are configured to retain the cutting member to the cutting member retainer when the rotary head assembly is in use and configured to release the cutting member when a desired force is applied to the flange; and (d) the non-flange end portion is positioned opposite of the flange.

The term top cover end portion and lower cover end portion are not meant be literal but are references based on an imaginary longitudinal axis. The top cover end portion and lower cover end portion may be separate pieces or a single piece. The top cover end portion and lower cover end portion maybe held together by any known means in the art such as a screws, snaps, bolts, groves, pins, fasteners, or the like. In one embodiment, top cover end portion and lower cover end portion are configured and shaped to house at least one spring biased cutting member receptacle and at least one spring. In a further embodiment, either the top cover end portion or lower cover end portion are configured to have at least one hole 38 sized to extend only for the flange 28 of spring biased cutting member receptacle therethrough. In another embodiment, top cover end portion and lower cover end portion are configured to allow the spring biased cutting member receptacle to rotate or move in the same and/or different direction as the rotary read assembly. In another embodiment, the top cover end portion and lower cover end portion are configured to allow the spring biased cutting member to move in the direction towards the top cover end portion and lower cover end portion. In one embodiment, as seen in FIG. 1, the spring 17 is positioned between (i) the non-flange end portion 30 of the spring biased cutting member receptacle 16 and top cover end portion 18. In another embodiment, the spring may be positioned between the housed between the non-flange end portion of the spring biased cutting member receptacle lower cover end portion. In another embodiment, the top cover end portion and lower cover end portion define a gap 40, see FIG. 2, sufficient to extend the cutting member 36 from the rotary head.

The spring biased cutting member receptacle of the present invention may be spatially arranged in any configuration or combinations relative to the with the rotary head assembly. In another embodiment, the spring biased cutting member receptacle may be configured as part of the rotary head assembly or as removable attachments. In yet another embodiment, the rotary head of the present invention may be configured to receive a single spring biased cutting member receptacle or a plurality of the spring biased cutting member receptacle. In yet a further embodiment, where there are at least two spring biased cutting member receptacles, each cutting member receptacle may be spatially arranged in any configuration relative to the other, non-limiting examples include, above, below, opposite, next to, within, or combinations thereof.

Figure 3:
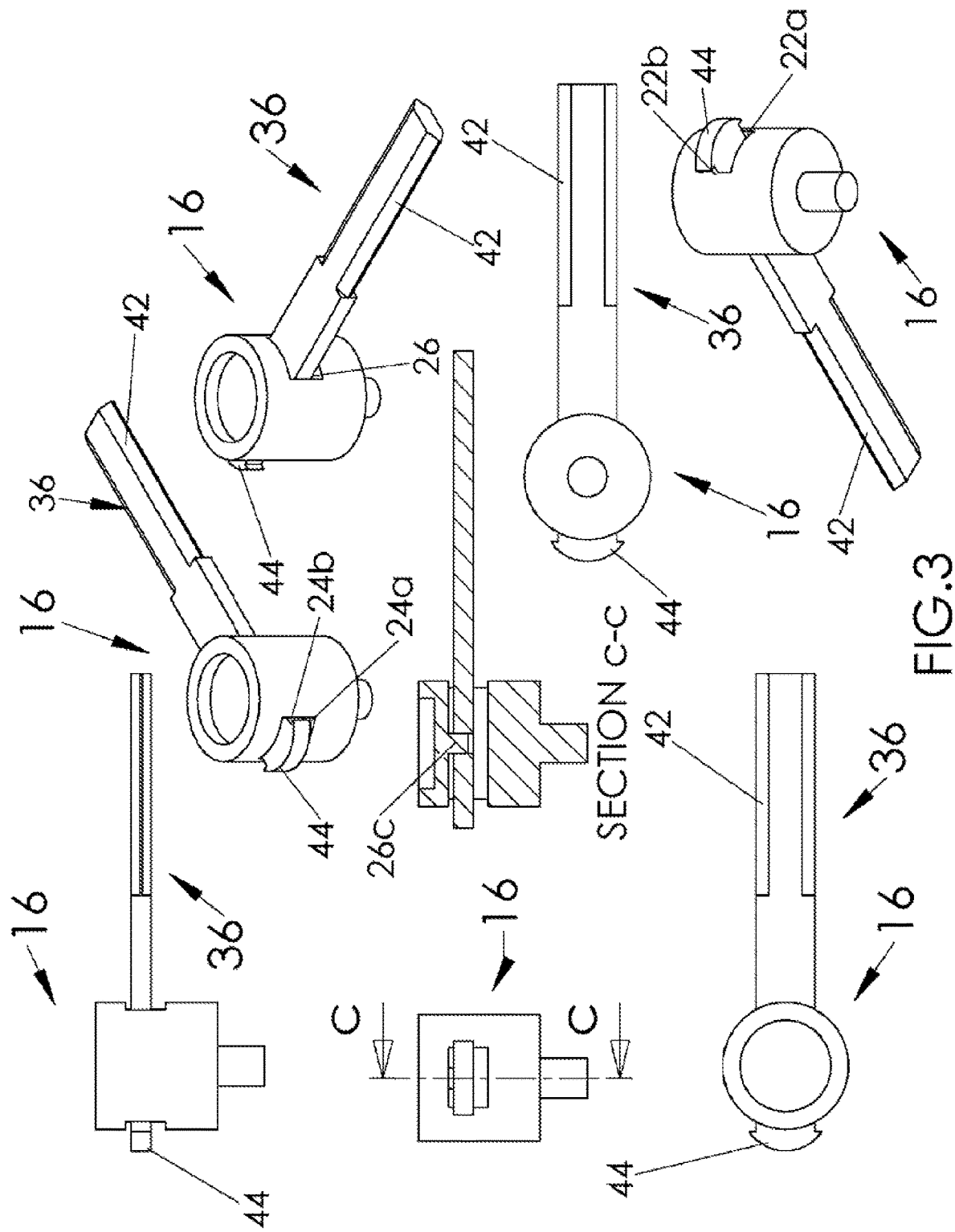
FIG. 3 are perspective views and a cross-sectional view of the spring biased cutting member receptacle with one aspect of the present invention.

The spring biased cutting member receptacle 16 portion of the present invention may form various shapes and configurations. In one embodiment, such as shown in FIG. 3, one skilled in the art may shape and configure the spring biased cutting member receptacle 16 to receive different types of cutting members such as a cutting member shaped like a blade 36, wherein said cutting member of this embodiment has a cutting portion 42 and an attachment portion 44 configured to engage and be retained with the cutting member retainer 26. The cutting member retainer 26 of the present invention may be configured in any form or shape to engage and retain the cutting member. In one example, as seen in FIG. 3, the cutting member retainer comprises wider lower cutter inlet 22a portion and wider lower cutter outlet portion compared to the upper cutter inlet portion 22b and the upper cutter outlet portion 24b. The cutting member retainer may also be a groove, indentation, or a recess. In another embodiment, the cutting member retainer 26c is a downward lip, and may be of any non-limiting shapes such as angular, rectangular, hook-like, combinations thereof, or any shape capable of retaining the cutting member. In one embodiment, the cutting member retainer is configured and shaped to receive cutting member through the cutter inlet or release the cutting member through the cutter inlet or cutter outlet when the desired force is applied to the flange and to retain the cutting member when no desired force is applied to the flange.

Figure 4:
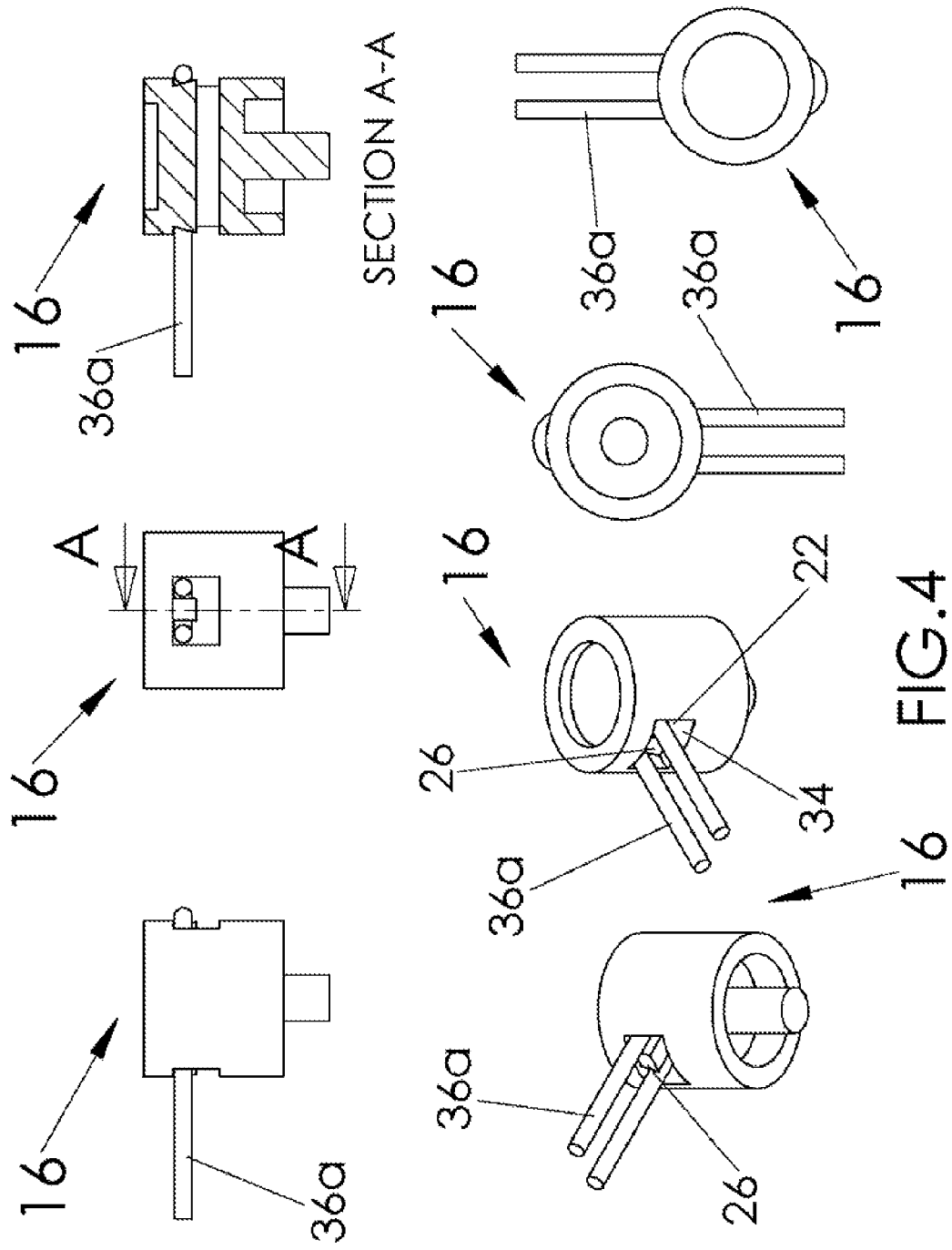
FIG. 4 are perspective views and a cross-sectional view of the spring biased cutting member receptacle with one aspect of the present invention.

In another embodiment, as seen in FIG. 4, the spring biased cutting member receptacle 16 is provided comprising a strand or sting-like cutting member 36a. The cutting member 36a is inserted in the cutter inlet 22 and through the channel 34 and looped through the cutting member retainer 26 and back out though the cutter inlet, preferably the edges of the cutting member 36a are adjacent to one another.

The term "desired force" as used in herein refers to the force necessary when applied to the flange to move the spring biased cutting member receptacle to a position that allows the user to remove, insert, or replace the cutting member from the cutting member retainer.

The term "spring" refers to any flexible or coiled material that exerts force when it is bent, compressed or stretched. The spring may be of any shape known in the art such as coiled, helical, spiral, flat, bent, conical shaped. Non-limiting examples of springs include coils, cantilevers, conical, elastic bands, or any other types of springs known in the art. In one embodiment, the spring is configured to retain or secure the cutting member to the cutting member retainer.

In one embodiment, either the top cover end portion or the lower cover end portion is configured and positioned to block the access of the cutting member from the channel when there are no force applied to the flange and allows access of the cutting member to the channel when the desired force is applied to the flange.

In another embodiment, the spring is sized and configured to secure the spring biased cutting member receptacle within the top cover end portion and lower cover end portion. In a preferred embodiment, the spring is sized and configured in a manner that prevents the cutting member from sliding out of the channel between the cutter inlet and the cutter outlet when there is no desired force applied to the flange. Thus in one example, the spring is configured so that it exerts enough force to position the spring biased cutting member receptacle in a manner sufficient to extend the cutting member through the gap defined by the top cover end portion and lower cover end portion and to position the spring biased cutting member receptacle where either the edge of the top cover end portion or the edge of the lower cover end portion obstructs the channel defined by the cutter inlet and cutter outlet in a manner to prevent the cutting member to detaching from the cutting member retainer when the rotary head is in use or when there is no desired force is applied to the flange. In another embodiment, the spring is sized and configured to position the spring biased cutting member receptacle when a desired force is applied to the flange in a manner sufficient to provide enough clearance space between the gap and the channel to remove, release, slide or thread the cutting member through the cutter outlet or cutter inlet.

In one embodiment, the present invention is configured to receive cutting members such as those that are commercial available such as flexible monofilament plastic trimmer lines of any suitable type and cross-sectional configuration, e.g., 0.065, 0.080, 0.095, 0.105, 0.12, 0.13 or 0.15 gauge nylon trimmer line or the like.

Except as may be expressly otherwise indicated, the article "a" or "an" if and as used herein is not intended to limit, and should not be construed as limiting, the description or a claim to a single element to which the article refers. Rather, the article "a" or "an" if and as used herein is intended to cover one or more such elements, unless the text expressly indicates otherwise.

Each and every patent or other publication or published document referred to in any portion of this specification is incorporated in toto into this disclosure by reference, as if fully set forth herein.

This invention is susceptible to considerable variation within the spirit and scope of the appended claims.

The invention claimed is:

1. An apparatus comprising a rotary head assembly, wherein the rotary head assembly comprises at least one spring biased cutting member receptacle non-concentrically positioned relative to a center axis of the rotary head assembly, at least one spring, a top cover end portion and a lower cover end portion, wherein:
   (i) the top cover end portion and lower cover end portion define at least one recess for housing the at least one spring biased cutting member receptacle; and
   (ii) the at least one spring biased cutting member receptacle having a cylindrical shape and comprises at least one cutter inlet, at least one cutter outlet, at least one cutting member retainer, at least one flange, and a non-flange end portion, wherein
      (a) the at least one cutter inlet is positioned opposite the at least one cutter outlet and defines a channel extending from the at least one cutter inlet to the at least one cutter outlet sized and configured to receive at least one cutting member;

(b) the at least one cutting member retainer is positioned in between the at least one cutter inlet and the at least one cutter outlet and configured so that the at least one cutting member may be inserted into the at least one cutter inlet and engaged with the at least one cutting member retainer;

(c) the at least one flange and the at least one spring are configured to retain the at least one cutting member to the at least one cutting member retainer when the rotary head assembly is in use and configured to release the at least one cutting member when a desired force is applied to the at least one flange; and (d) the non-flange end portion is positioned opposite of the at least one flange.

2. The apparatus of claim 1, wherein either the top cover end portion or lower cover end portion is configured to have at least one hole sized to allow the at least one flange to extend therethrough.

3. The apparatus of claim 1, wherein the at least one spring is positioned between (i) the non-flange end portion of the spring biased cutting member receptacle and (ii) either the top cover end portion or the lower cover end portion.

4. The apparatus of claim 1, wherein the at least one cutting member retainer is configured and shaped to receive the at least one cutting member through the at least one cutter inlet or release the at least one cutting member through the at least one cutter inlet or the at least one cutter outlet when the desired force is applied to the at least one flange and to retain the at least one cutting member when no desired force is applied to the at least one flange.

5. The apparatus of claim 1 wherein either the top cover end portion or the lower cover end portion is configured and positioned to block the access of the cutting member from the inlet when the desired force is not applied to the flange and allows access of the cutting member to the channel when the desired force is applied to the at least one flange.

6. An apparatus comprising a rotary head assembly, wherein the rotary head assembly comprises at least two spring biased cutting member receptacles each having a cylindrical shape non-concentrically positioned relative to a center axis of the rotary head assembly, wherein each of the spring biased cutting member receptacles:

(i) optionally is rotatable relative to the rotary head assembly;

(ii) comprises an outer body having at least one recess for receiving at least one biasing member, wherein the outer body defines at least one cutter inlet and at least one cutter outlet, wherein the cutter inlet is positioned opposite the at least one cutter outlet and defines a channel extending from the at least one cutter inlet to the at least one cutter outlet sized and configured to receive at least one cutting member; the outer body comprises at least one cutting member retainer positioned in between the at least one cutter inlet and the at least cutter outlet so that the at least one cutting member may be inserted into the at least one cutter inlet and engaged with the at least one cutting member retainer;

(iii) the at least one spring biased cutting member receptacle further comprises a flange and a non-flange end portion, wherein the non-flange end portion is positioned opposite of the flange; and (iv) the at least one biasing member comprises at least one spring configured to move the non-flange end portion further away from the at least one cutting member retainer, allowing the at least one cutting member to be inserted or removed through the channel when a desired force is applied to the flange and to move the non-flange end portion closer to the at least one cutting member retainer to retain the at least one cutting member within the at least one cutting member retainer when the desired force is not applied to the flange or when the rotary head assembly is in use.

7. An apparatus according to claim 1 or 6, wherein the at least one cutting member rotates in the same and opposite direction of the rotary head assembly during use.

8. An apparatus according to claim 1 or 6, wherein the at least one spring biased cutting member receptacle is fixed onto the rotary head assembly.

9. An apparatus according to claim 1 or 6, wherein the at least one cutting member is selected from the group consisting of a flexible, semi-rigid, and rigid material.

10. An apparatus according to claim 1 or 6, wherein the spring biased cutting member receptacle is peripherally positioned equidistant from a second spring biased cutting member receptacle.

11. An apparatus according to claim 1 or 6, wherein the at least one spring biased cutting member receptacle comprises a lower cutter inlet portion and an upper cutter outlet portion.

12. An apparatus according to claim 1, wherein the at least one spring biased cutting member receptacle rotates relative to the rotary head assembly.

* * * * *